US012795126B2

(12) United States Patent
Oh et al.

(10) Patent No.: US 12,795,126 B2
(45) Date of Patent: Nov. 10, 2026

(54) METHOD FOR ENCODING/DECODING VIDEO AND RECORDING MEDIUM STORING METHOD FOR ENCODING VIDEO

(71) Applicant: Electronics and Telecommunications Research Institute, Daejeon (KR)

(72) Inventors: Kwan-Jung Oh, Daejeon (KR); Gwangsoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 88 days.

(21) Appl. No.: 18/907,829

(22) Filed: Oct. 7, 2024

(65) Prior Publication Data

US 2025/0119558 A1 Apr. 10, 2025

(30) Foreign Application Priority Data

Oct. 6, 2023 (KR) ........................ 10-2023-0133814
Jan. 15, 2024 (KR) ........................ 10-2024-0006358
Jul. 8, 2024 (KR) ........................ 10-2024-0089880
Oct. 4, 2024 (KR) ........................ 10-2024-0135010

(51) Int. Cl.
*H04N 19/186* (2014.01)
*H04N 19/184* (2014.01)
*H04N 19/70* (2014.01)

(52) U.S. Cl.
CPC ......... *H04N 19/186* (2014.11); *H04N 19/184* (2014.11); *H04N 19/70* (2014.11)

(58) Field of Classification Search
None
See application file for complete search history.

(56) References Cited

U.S. PATENT DOCUMENTS

2016/0366391 A1 12/2016 Lim
2017/0064312 A1* 3/2017 Une ........................ H04N 19/36
2020/0007867 A1* 1/2020 Tourapis .............. H04N 19/156

OTHER PUBLICATIONS

Sonoda et al. "Depth image compression by colorization for Intel® RealSense™ Depth Cameras" *Intel, Rev 1.0*, 2021 (pp. 1-15).

* cited by examiner

*Primary Examiner* — Christopher Braniff
(74) *Attorney, Agent, or Firm* — NSIP Law

(57) ABSTRACT

An image encoding method according to the present disclosure may include performing a low gradational conversion for an original depth image of a first bit depth to generate a first depth image of a second bit depth; and encoding the first depth image through a color image of a third bit depth. In this case, the third bit depth may be smaller than the second bit depth.

11 Claims, 12 Drawing Sheets
(1 of 12 Drawing Sheet(s) Filed in Color)

METHOD FOR ENCODING/DECODING VIDEO AND RECORDING MEDIUM STORING METHOD FOR ENCODING VIDEO

CROSS-REFERENCE TO RELATED APPLICATIONS

This application claims the benefit under 35 USC § 119(a) of Korean Patent Application Nos. 10-2023-0133814 filed on Oct. 6, 2023, 10-2024-0006358 filed on Jan. 15, 2024, 10-2024-0089880 filed on Jul. 8, 2024, and 10-2024-0135010 filed on Oct. 4, 2024, in the Korean Intellectual Property Office, the entire disclosures of which are incorporated herein by reference for all purposes.

TECHNICAL FIELD

The present disclosure relates to a method for encoding/decoding an immersive image which supports motion parallax for rotation and translation motions.

BACKGROUND ART

A virtual reality service is evolving in a direction of providing a service in which a sense of immersion and realism are maximized by generating an omnidirectional image in a form of an actual image or CG (Computer Graphics) and playing it on HMD, a smartphone, etc. Currently, it is known that 6 Degrees of Freedom (DoF) should be supported to play a natural and immersive omnidirectional image through HMD. For a 6DoF image, an image which is free in six directions including (1) left and right rotation, (2) top and bottom rotation, (3) left and right movement, (4) top and bottom movement, etc. should be provided through a HMD screen. But, most of the omnidirectional images based on an actual image support only rotary motion. Accordingly, a study on a field such as acquisition, reproduction technology, etc. of a 6DoF omnidirectional image is actively under way.

DISCLOSURE

Technical Solution

The present disclosure is to provide a method for colorizing and encoding/decoding a depth image.

The present disclosure is to provide a method for encoding/decoding metadata for colorizing a depth image.

The technical objects to be achieved by the present disclosure are not limited to the above-described technical objects, and other technical objects which are not described herein will be clearly understood by those skilled in the pertinent art from the following description.

Technical Solution

An image encoding method according to the present disclosure may include performing a low gradational conversion for an original depth image of a first bit depth to generate a first depth image of a second bit depth; and encoding the first depth image through a color image of a third bit depth. In this case, the third bit depth may be smaller than the second bit depth.

In an image encoding method according to the present disclosure, information of bits corresponding to a third bit depth in the first depth image may be allocated to a luma channel of the color image, and information of residual bits not allocated to the luma channel in the first depth image may be allocated to a chroma channel of the color image.

In an image encoding method according to the present disclosure, information representing the number of residual bits allocated to the chroma channel may be encoded as metadata.

In an image encoding method according to the present disclosure, a value of pixels in the chroma channel may be centralized.

In an image encoding method according to the present disclosure, the centralization may add a median value of the third bit depth to a pixel value.

In an image encoding method according to the present disclosure, a second depth image of the third bit depth generated by performing a low gradational conversion for the original depth image may be allocated to a luma channel of the color image.

In an image encoding method according to the present disclosure, a difference image between the third depth images generated by performing a high gradational conversion for the first depth image and the second depth image to the second bit depth may be allocated to a chroma channel of the color image.

In an image encoding method according to the present disclosure, a first partial image of the difference image may be allocated to a first chroma channel of the color image, and a second partial image of the difference image may be allocated to a second chroma channel of the color image.

In an image encoding method according to the present disclosure, the first partial image may be composed of even columns or even rows of the difference image, and the second partial image may be composed of odd columns or odd rows of the difference image.

In an image encoding method according to the present disclosure, a flag representing whether a depth image is colorized and encoded may be encoded as metadata.

An image decoding method according to the present disclosure may include decoding a color image of a first bit depth; reconstructing a first depth image of a second bit depth from the decoded color image; and reconstructing a second depth image of a third bit depth by performing a high gradational conversion for the first depth image. In this case, the first bit depth may be smaller than the second bit depth.

In an image decoding method according to the present disclosure, information of bits corresponding to a first bit depth in the first depth image may be decoded from a luma channel of the color image, and information of residual bits not allocated to the luma channel in the first depth image may be decoded from a chroma channel of the color image.

In an image decoding method according to the present disclosure, information representing the number of residual bits allocated to the chroma channel may be signaled as metadata.

In an image decoding method according to the present disclosure, the first depth image may be reconstructed by decentralizing a value of pixels in the chroma channel.

In an image decoding method according to the present disclosure, the decentralization may subtract a median value of the first bit depth from a pixel value.

In an image decoding method according to the present disclosure, a third depth image of the first bit depth generated by performing a low gradational conversion for an original depth image may be decoded from a luma channel of the color image.

In an image decoding method according to the present disclosure, a difference image may be decoded from a chroma channel of the color image, and the second depth image may be reconstructed by adding the difference image to the third depth image.

In an image decoding method according to the present disclosure, a first partial image of the difference image may be decoded from a first chroma channel of the color image, and a second partial image of the difference image may be decoded from a second chroma channel of the color image.

In an image decoding method according to the present disclosure, the first partial image may be composed of even columns or even rows of the difference image, and the second partial image may be composed of odd columns or odd rows of the difference image.

According to the present disclosure, a computer readable recording medium recording a command for performing an image encoding method or an image decoding method may be provided.

In addition, according to the present disclosure, a computer readable recording medium storing a bitstream generated by an image encoding method may be provided.

The technical objects to be achieved by the present disclosure are not limited to the above-described technical objects, and other technical objects which are not described herein will be clearly understood by those skilled in the pertinent art from the following description.

Technical Effect

According to the present disclosure, a high-bit depth image may be encoded/decoded into a low-bit depth image by colorizing a depth image.

According to the present disclosure, a colorized depth image may be effectively encoded/decoded by providing metadata for colorizing a depth image.

Effects achievable by the present disclosure are not limited to the above-described effects, and other effects which are not described herein may be clearly understood by those skilled in the pertinent art from the following description.

BRIEF DESCRIPTION OF DRAWINGS

The patent or application file contains at least one drawing executed in color. Copies of this patent or patent application publication with color drawing(s) will be provided by the Office upon request and payment of the necessary fee.

MODE FOR INVENTION

Figure 1:
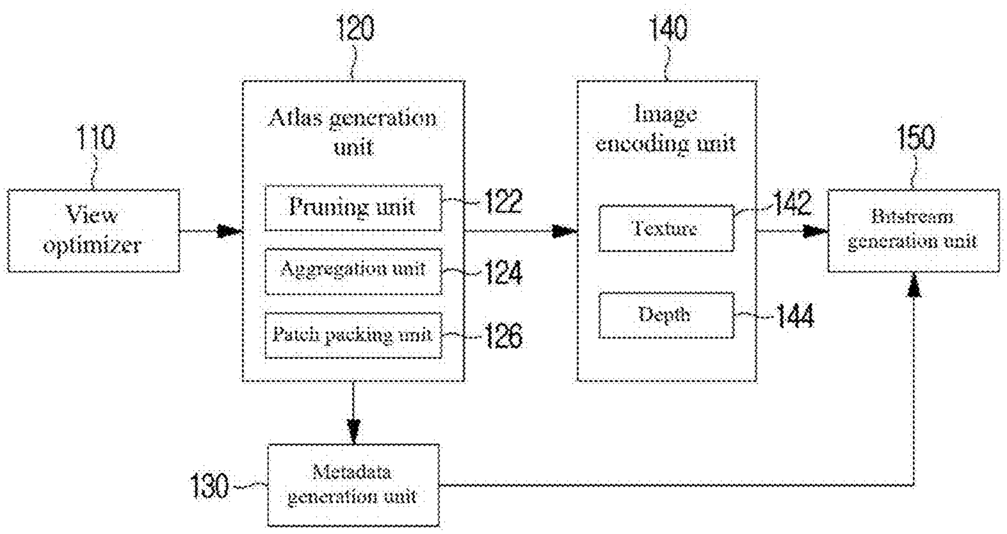
FIG. 1 is a block diagram of an immersive video processing device according to an embodiment of the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as “include” or “have”, etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of “including” a specific configuration in the present disclosure does not exclude a configuration other than a corresponding configuration, and it means that an additional configuration may be included in a scope of a technical idea of the present disclosure or an embodiment of the present disclosure.

A term “at least A, B or C” or “at least A, B and C” used in the present disclosure represents A, B, C, AB, AC, BC or ABC (here, AB represents A and B).

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user’s watching position is changed, refers to an image that a viewport may be also dynamically changed. In order to implement an immersive video, a plurality of input images are required. Each of a plurality of input images may be referred to as a source image or a view image. A different view index may be allocated to each view image. An immersive image may be composed of images with a different view, and accordingly, an immersive image may be referred to as a multi-view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image (or, a depth map) as well as a texture image is also required.

It is assumed that embodiments described below are for immersive video processing including depth information such as 3DoF+ and/or 6DoF, etc. In addition, it is assumed that a view image is configured with a texture image and a depth image.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an image encoding unit 140 and a bitstream generation unit 150.

An immersive video processing device receives a plurality of pairs of images, a camera internal variable and a camera external variable as an input value to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera internal variable includes a focal distance, a position of a principal point, etc. and a camera external variable includes a position, a direction, etc. of a camera. A camera internal variable and a camera external variable may be treated as a camera parameter or a view parameter.

A view optimizer 110 partitions view images into a plurality of groups. As view images are partitioned into a plurality of groups, independent encoding processing per each group may be performed. In an example, view images filmed by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on a camera parameter. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image filmed by a camera with a highest priority, a view image filmed by a camera with a lowest priority, a view image filmed by a camera at a predefined position (e.g., a central position) or a view image filmed by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a square image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. As an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry_scaling_factor_x, a syntax representing a horizontal directional reduction ratio of a depth atlas, and geometry_scaling_factor_y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

Figure 2:
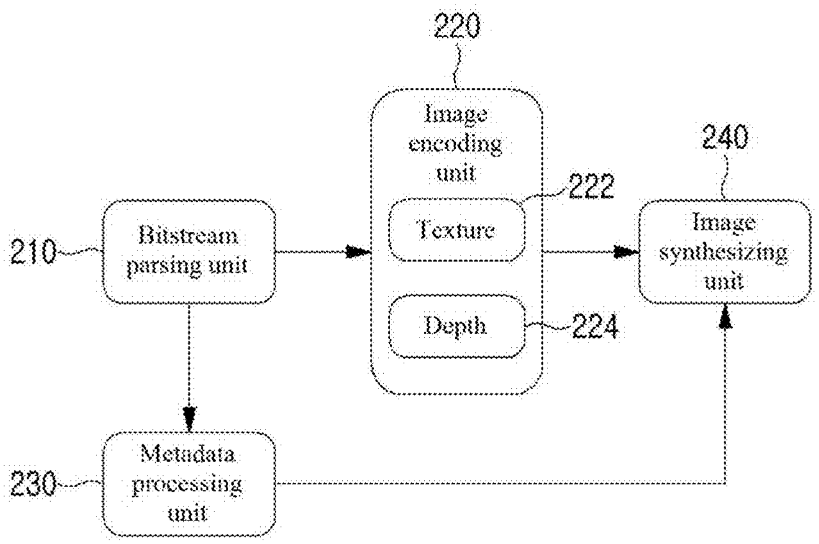
FIG. 2 is a block diagram of an immersive video output device according to an embodiment of the present disclosure.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

Figure 3:
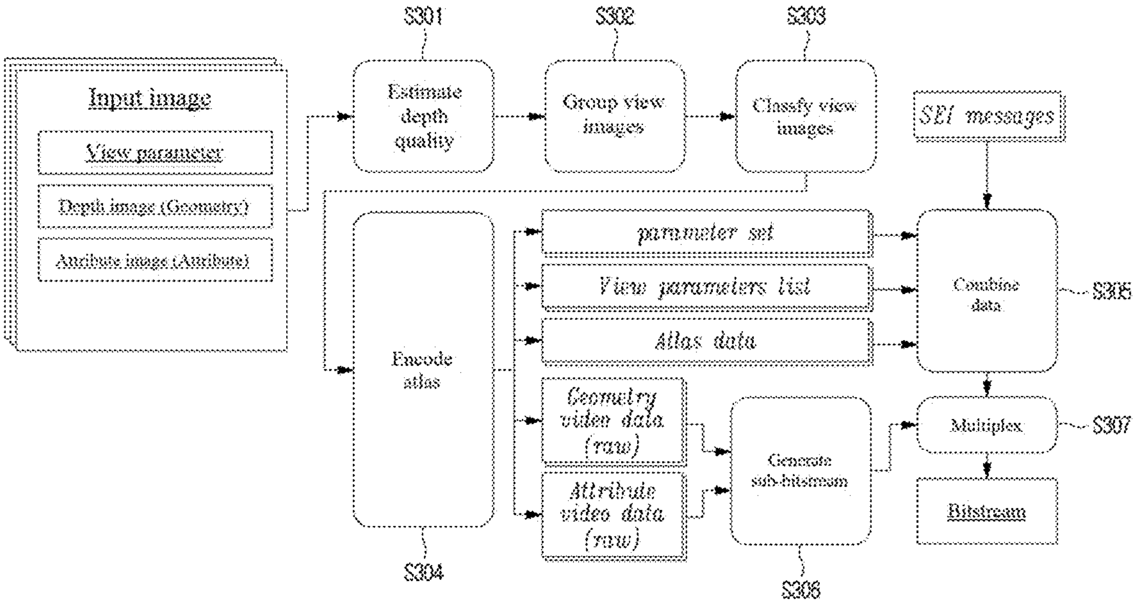
FIG. 3 is a flow chart of an immersive video processing method.
Figure 5:
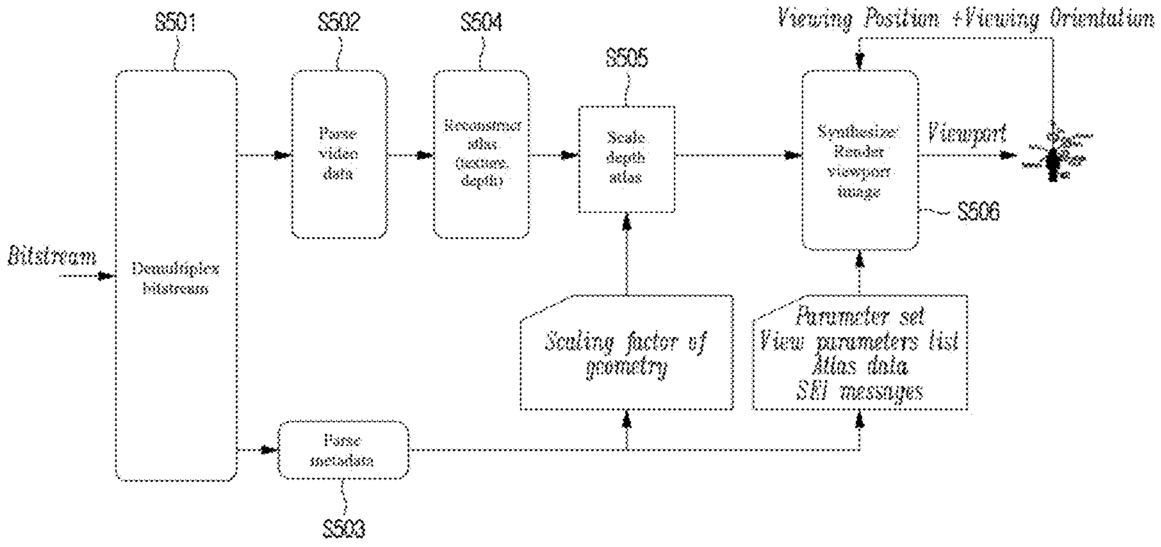
FIG. 5 is a flow chart of an immersive video output method.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be configured.

Figure 4:
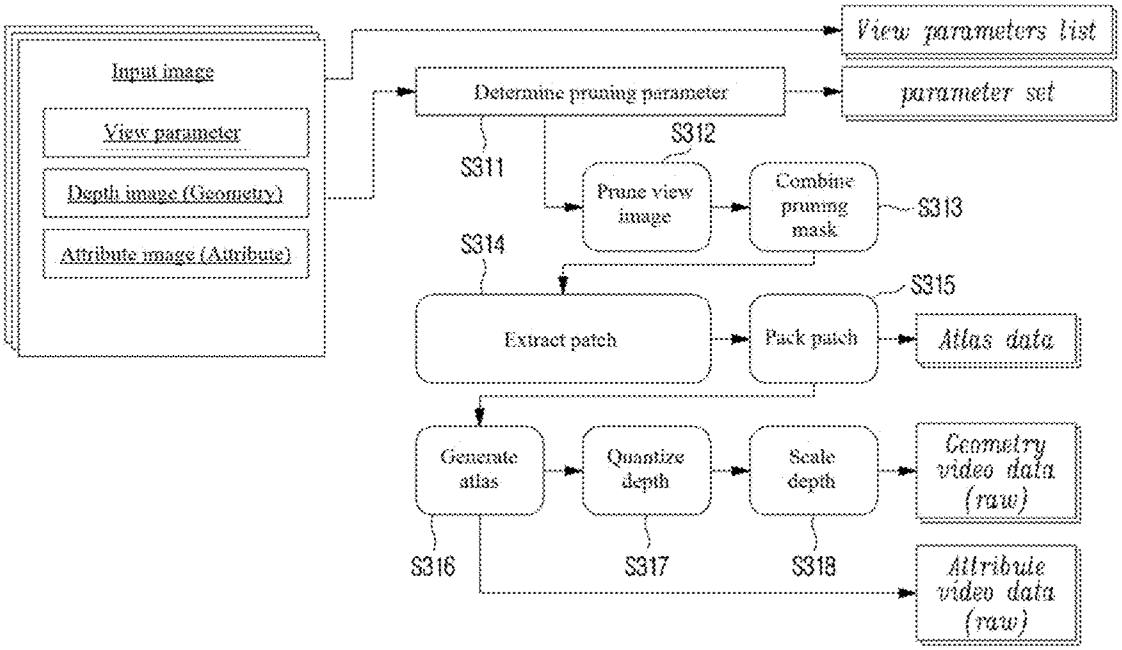
FIG. 4 is a flow chart of an atlas encoding process.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an unpruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306. And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize generated patches, size/position information of each patch and a camera parameter, etc. may be used.

As described above, a texture atlas generated from texture images of a plurality of views and a depth atlas generated from depth images of a plurality of views may be encoded and signaled to a decoder. Meanwhile, a texture image may also be referred to as a color image.

In other words, a depth image may be packed into an atlas through a pruning process in the same way as a texture image. Meanwhile, the spatial resolution of a depth image may be smaller than the spatial resolution of a texture image. As an example, a depth image may have a size that is ¼ of a texture image (i.e., each of a width and a height is ½ of a texture image). Accordingly, a depth atlas may also have a smaller size than a texture atlas.

A depth image may be composed of depth information representing how far physically each pixel is from a camera, not directly visible image information like a texture image. Depth information may be acquired directly through a depth sensor or may be acquired from a color image through the depth estimation technology. Alternatively, depth information may be acquired through the deep learning technology.

Due to a feature as above, a depth image is generally expressed as a mono image. Accordingly, a depth image may be expressed with only one channel.

A depth image is three-dimensional information used for rendering, and generally, rendering image quality is improved as the accuracy of a depth image is higher.

Meanwhile, a depth image may be converted in a low gradated way for depth image compression. As an example, the original data of a depth image is 16 bits, but a depth image may be converted to 10 bits for depth image compression. In other words, an expression region of a depth image may be reduced from 16 bits to 10 bits, reducing the amount of data that must be encoded/decoded. In this way, a conversion for reducing the number of bits of an image may be defined as a low gradational conversion, and a conversion for increasing the number of bits of an image may be defined as a high gradational conversion.

Meanwhile, in the present disclosure, performing a high gradational conversion or a low gradational conversion for an image may be a bit-shifting operation method. Alternatively, without being limited to this method, a more complex high gradational conversion or low gradational conversion technology targeting a high dynamic range (HDR) image may be used. When a technology other than the listed methods is utilized to increase or decrease the number of bits of an image, it may also be referred to being included in the technical idea of the present disclosure.

Meanwhile, when a low gradational conversion is performed for a depth image, loss of depth information occurs. In order to minimize the loss of depth information due to performing a low gradational conversion, only a value between the minimum value and the maximum value in a region where depth information actually exists may be converted according to the expression range of the number of low bits. Nevertheless, loss due to a reduction in the number of bits is inevitable.

Accordingly, the present disclosure proposes a method for encoding/decoding a depth image by using at least one chroma channel (i.e., at least one of U and V channels). Here, a depth image may refer to a depth atlas generated from a plurality of depth images.

Figure 6:
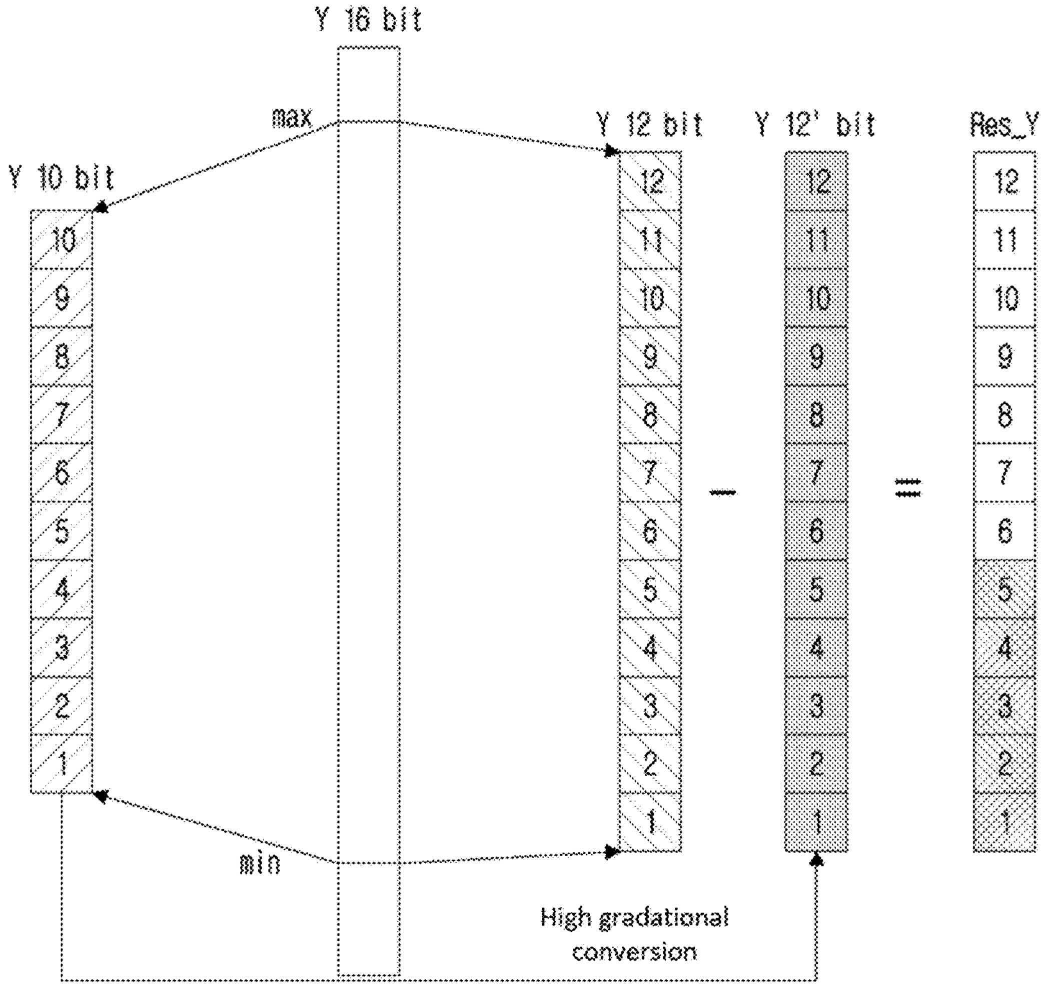
FIG. 6 is a diagram for describing a method for encoding/decoding a depth image according to an embodiment of the present disclosure.

FIG. 6 is a diagram for describing a method for encoding/decoding a depth image according to an embodiment of the present disclosure.

In the present disclosure, a depth image generated by performing a low gradational conversion for an original depth image may be defined as a depth image to be encoded. A bit depth of a depth image to be encoded may be smaller than that of an original depth image.

In addition, a depth image generated by performing a high gradational conversion for a depth image to be encoded may be referred to as a first reference depth image. It is assumed that a bit depth of a first reference depth image is larger than that of a depth image to be encoded and for an original depth, an original depth image is 16 bits and a depth image to be encoded is 10 bits. In addition, it is assumed that a first reference depth image and a second reference depth image are 12 bits. However, the values of bit depths above are assumed only for the convenience of a description, and do not limit embodiments according to the present disclosure.

Referring to FIG. 6, a low gradational conversion for a 16-bit original depth image is performed to generate a 10-bit depth image to be encoded (a luma channel, Y 10 bit).

In addition, a low gradational conversion for a 16-bit original depth image is performed to generate a 12-bit first reference depth image (a luma channel, Y 12 bit).

In addition, a high gradational conversion for a 10-bit depth image is performed to generate a 12-bit second reference depth image (a luma channel, Y 12' bit).

Afterwards, a 12-bit second reference depth image and a 12-bit second reference depth image may be differentiated to obtain a difference image. In this case, unlike general depth information, a pixel in a difference image may have a negative value.

In addition, since a first reference depth image and a second reference depth image have a high mutual similarity, an absolute value of each pixel in a difference image will have a relatively low value. Accordingly, a difference image between two 12-bit reference images may be encoded/decoded with the number of bits lower than 12 bits. Specifically, in the present disclosure, a generated difference image may be encoded/decoded through a 10-bit chroma channel (i.e., at least one of U or V channels).

As a result, a depth image to be encoded which is generated by performing a low gradational conversion for a 16-bit original depth image may be inserted into a luma channel of a 10-bit image composed of 3 channels, and a difference image between reference depth images may be inserted into a chroma channel.

In this case, a shifting operation for a difference depth image value may be performed to convert a pixel having a negative value in a difference image to a positive value. As an example, a pixel with a value of 0 may be converted to 512, an intermediate value of 10 bits, through a shifting operation.

Of course, a pixel with a negative value may also be converted to a positive value in another way. As an example, in a 10-bit image, a value from 0 to 511 may represent that a pixel value is a positive value and a value from 512 to 1023 may represent that a pixel value is a negative value. In other words, when a pixel value is negative, a pixel value may be converted to a value from 512 to 1023.

Alternatively, one of the two chroma channels may reflect only positive pixel values and the other may reflect only negative pixel values. A detailed description thereof is described later.

The range of values may be expanded and expressed to ensure that a value of a difference image is robust to compression loss. As an example, if difference values in a difference image have a range of −4 to 4, it may be expanded by three times to convert difference values to values in a range of −12 to 12. By increasing the range of difference values, an error in a difference value that occurs in a decoding process may be minimized. As an example, an error of pixel value 1 that occurs when a difference value has a range of −4 to 4 may refer to an error of 1 as it is, but an error of pixel value 1 that occurs when a difference value is expanded by three times to a range of −12 to 12 may refer to an error of ⅓. In other words, if an original difference value is 12, but it is decoded to a value of 11 due to compression loss, when a decoded value is reconstructed to an original difference value by multiplying it by ⅓, 11 is closer to 12 than 9, so 11, a value wrongly decoded due to compression loss, will be reconstructed to a value of 4, not 3.

After partitioning a difference image into a plurality of partial images, each partitioned partial image may be encoded/decoded through a different chroma channel. As an example, a difference image may be divided into a first partial image and a second partial image, and a first partial image may be encoded/decoded through an U channel and a second partial image may be encoded/decoded through a V channel.

As an example, a first partial image composed of samples belonging to an even row of a difference image may be encoded/decoded by using any one of an U channel and a V channel, and a second partial image composed of samples belonging to an odd row of a difference image may be encoded/decoded by using the other of an U channel and a V channel.

Alternatively, a first partial image composed of samples belonging to an even column of a difference image may be encoded/decoded by using any one of an U channel and a V channel, and a second partial image composed of samples belonging to an odd column of a difference image may be encoded/decoded by using the other of an U channel and a V channel.

Alternatively, a first partial image composed of samples whose x-axis coordinate in a difference image is smaller than W/2 (here, W is a width of a difference image) may be encoded/encoded through any one of an U channel and a V channel, and a second partial image composed of samples whose x-axis coordinate is greater than or equal to W/2 may be encoded/encoded through the other of an U channel and a V channel.

Alternatively, a first partial image composed of samples whose y-axis coordinate in a difference image is smaller than H/2 (here, H is a height of a difference image) may be encoded/decoded through any one of an U channel and a V channel, and a second partial image composed of samples whose y-axis coordinate is greater than or equal to H/2 may be encoded/decoded through the other of an U channel and a V channel.

Meanwhile, a method for encoding/decoding a difference image may vary depending on a chroma format. It is because resolution between a Y channel and a chroma channel (i.e., an U channel and a V channel) is different according to an YUV chroma format.

Figure 7:
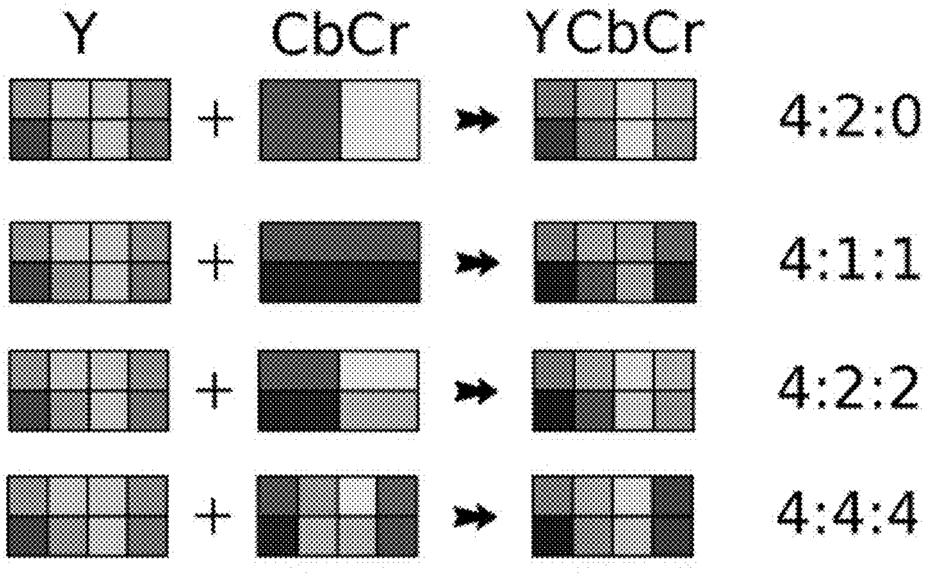
FIG. 7 is a diagram illustrating the concept of a YUV/YCbCr chroma format.

FIG. 7 is a diagram illustrating the concept of a YUV/YCbCr chroma format.

The relative resolution of a chroma channel compared to a Y channel is determined by color format. According to a resolution difference between a Y channel and a chroma channel, a difference image may be encoded/decoded through downsampling or a difference image may be encoded/decoded without downsampling.

As an example, when a chroma format is 4:2:0 or 4:1:1, downsampling for a difference image is performed, while if a chroma format is 4:2:2 or 4:4:4, a difference image may be encoded/decoded without downsampling.

As above, since an encoding/decoding method of a difference image may be set differently according to a chroma format, information on a chroma format may be defined as additional metadata and encoded/decoded.

Hereinafter, a specific encoding/decoding method according to a chroma format will be described.

A color image is generally implemented by using a YUV 4:2:0 chroma expression method. When a chroma format is 4:2:0, the resolution of each of U and V channels may be ½ the size of a Y channel in a width and a height, respectively. In other words, the resolution of each of U and V channels may be ¼ the size of a Y channel.

As such, under a 4:2:0 format, even if the number of pixels of an U channel and the number of pixels of a V channel are added, it is only ½ of a Y channel. Accordingly, when a chroma format is 4:2:0, there is a problem that U and V channels may not include the information of all pixels of a difference image.

In order to solve this problem, two pixels may be expressed as one pixel.

Figure 8:
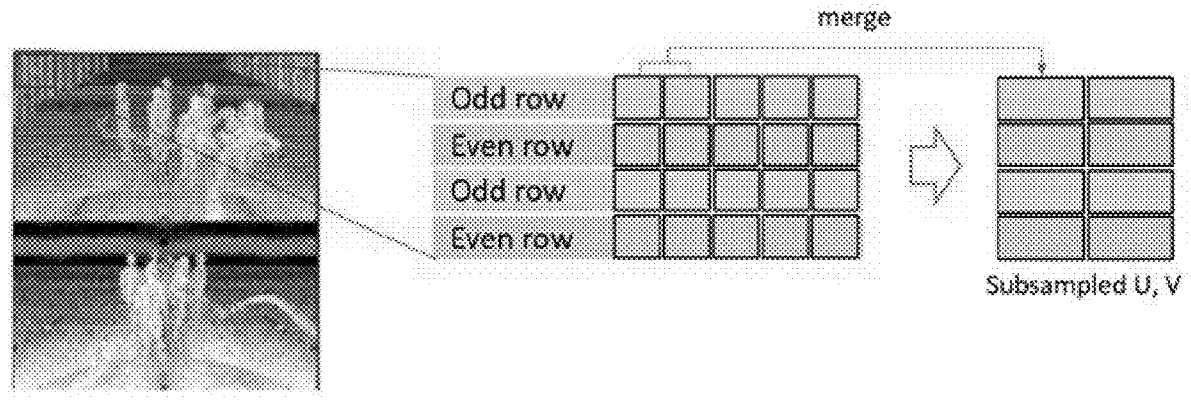
FIG. 8 shows an example in which two pixels are expressed as one pixel.
Figure 9:
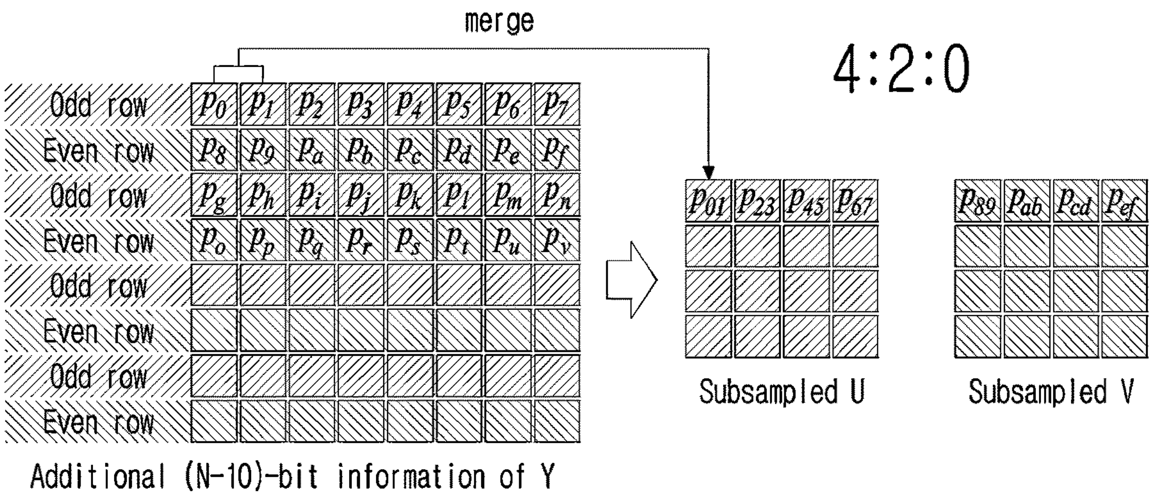
FIGS. 9 to 13 are a diagram showing an encoding/decoding aspect of a difference image according to a chroma format.
Figure 10:
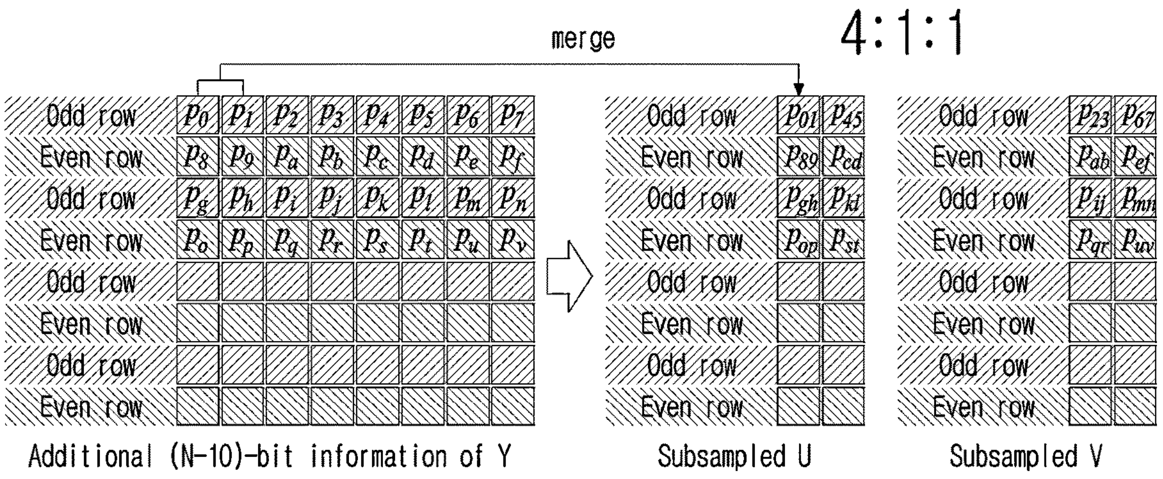
Figure 11:
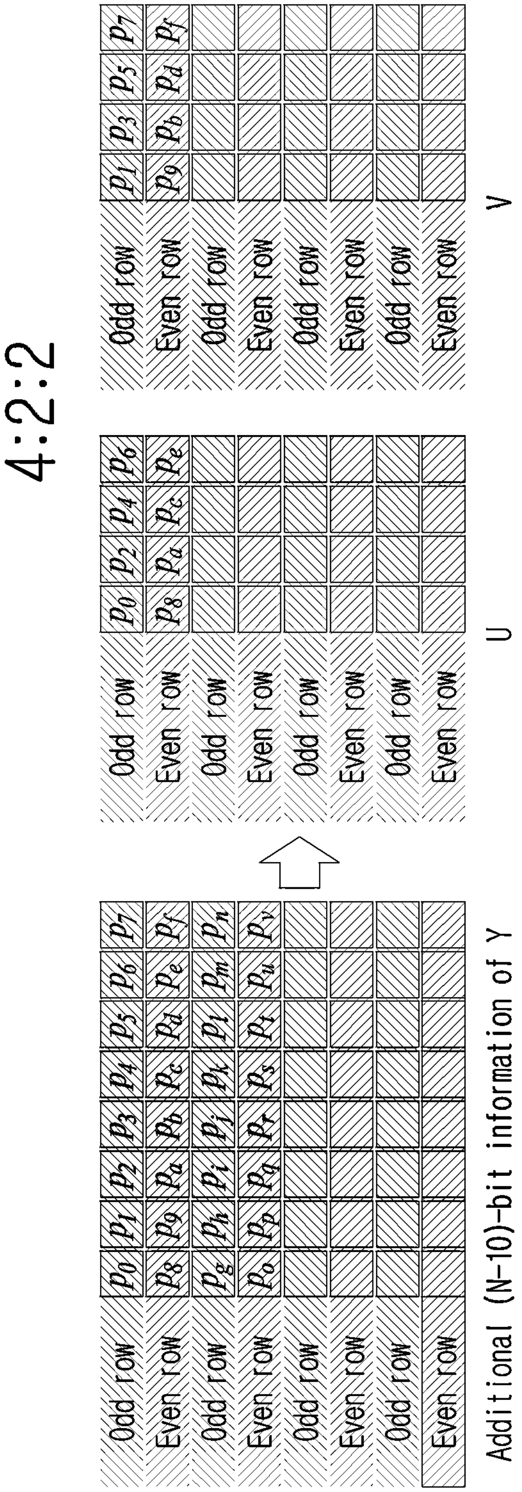
Figure 12:
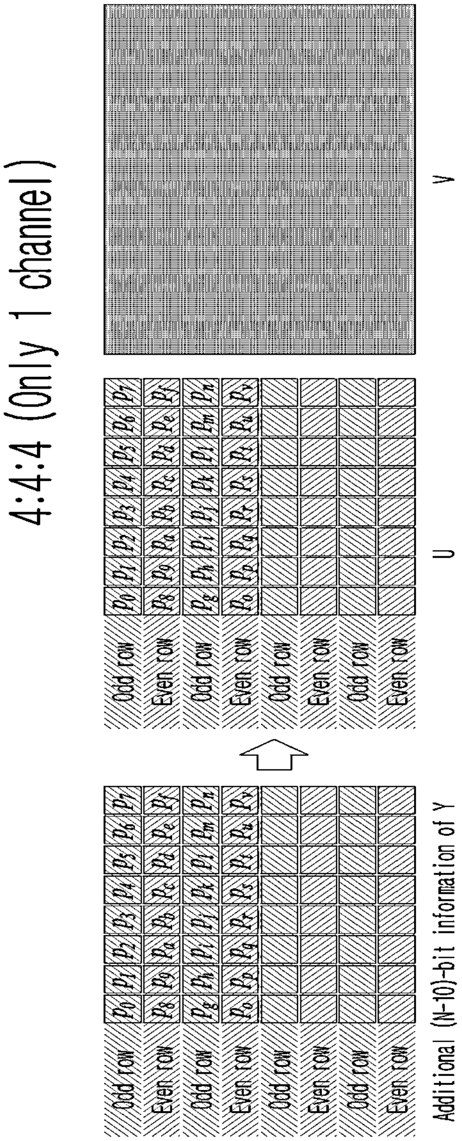
Figure 13:
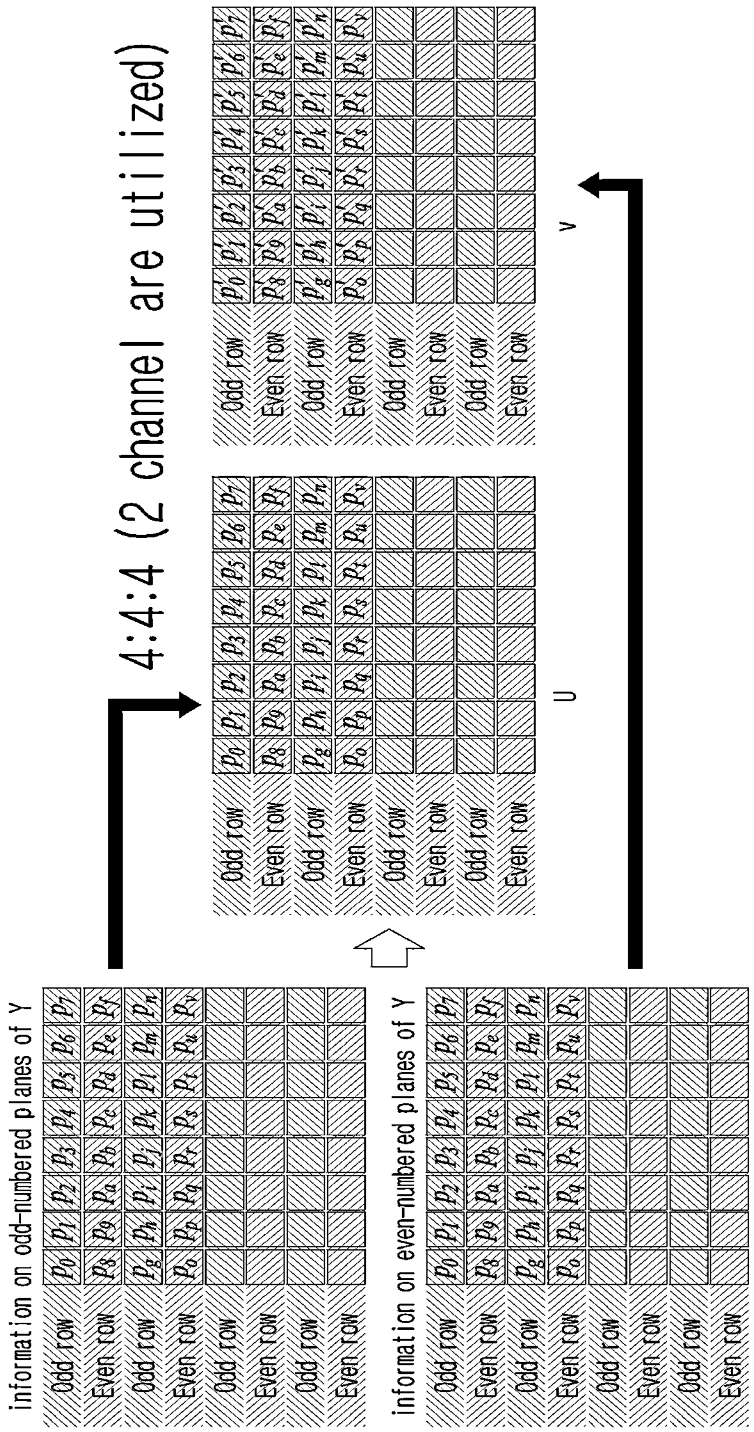

FIG. 8 shows an example in which two pixels are expressed as one pixel.

A representative value of two pixels configuring a difference image may be allocated to one pixel in a chroma channel (i.e., an U or V channel). Here, a representative value may be an average value, the maximum value or the minimum value of two pixels. Meanwhile, when a representative value is derived based on an average value, a rounding-down operation may be applied to a sub-pixel value (i.e., a fractional pixel value). Alternatively, a pixel value at a predefined position among the two samples may be set as a representative value. Here, a pixel at a predefined position may be a pixel at a left position or a right position among the two pixels adjacent horizontally or may be a pixel at a top position or a bottom position among the two pixels adjacent vertically.

In FIG. 8, it was illustrated that a representative value for two pixels adjacent horizontally is inserted into a chroma channel.

When a chroma format is 4:2:0, as in an example shown in FIG. 8, a first partial image and a second partial image generated through sub-sampling may be encoded/decoded through an U channel and a V channel.

On the other hand, when a chroma format is 4:2:2, a difference image may be encoded/decoded through an U channel and a V channel without loss of resolution.

Meanwhile, when a chroma format is 4:4:4, a difference image may be encoded/decoded by using only one of the two chroma channels.

Alternatively, when a chroma format is 4:4:4, a difference image may be encoded/decoded by using all of the two chroma channels.

As an example, an odd-numbered plane of a difference image may be encoded/decoded by using one of an U channel or a V channel, and an even-numbered plane of a difference image may be encoded/decoded by using the other one.

Alternatively, one of the two chroma channels may reflect only positive pixel values and the other may reflect only negative pixel values. As an example, a first partial image may be generated based on pixels with a positive pixel value in a difference image, and a second partial image may be generated based on pixels with a negative pixel value in a difference image.

Specifically, for a pixel with a positive pixel value in a difference image, a pixel value at a position corresponding to a positive pixel may be set to be the same as a positive pixel value in a first partial image, whereas a pixel value at a position corresponding to a positive pixel may be set as 0 in a second partial image. On the other hand, for a pixel with a negative pixel value in a difference image, a pixel value at a position corresponding to a negative pixel may be set as 0 in a first partial image, whereas a pixel value at a position corresponding to a negative pixel may be set as an absolute value of a negative pixel value in a second partial image.

Then, any one of a first partial image and a second partial image may be encoded/decoded through an U channel, and the other may be encoded/decoded through a V channel. In this case, a difference image may be reconstructed by subtracting a V channel from an U channel or by subtracting an U channel from a V channel.

FIGS. 9 to 13 are a diagram showing an encoding/decoding aspect of a difference image according to a chroma format.

In the above-described embodiment, it was illustrated that a difference image between two reference images is encoded/decoded through a chroma channel.

Unlike the above-described example, an original channel image is converted in a low gradated way to a first bit depth, but a depth image converted in a low gradated way may be encoded/decoded through a multi-channel image of a second bit depth. Here, a first bit depth may have a value greater than a second bit depth. For convenience of a description, it is assumed that a first bit depth is 12 bits and a second bit depth is 10 bits.

As an example, for a 12-bit depth image, 10-bit information of each pixel may be encoded/decoded through a Y channel, and the remaining 2-bit information may be encoded/decoded through at least one of the chroma channels, i.e., an U channel or a V channel.

Figure 14:
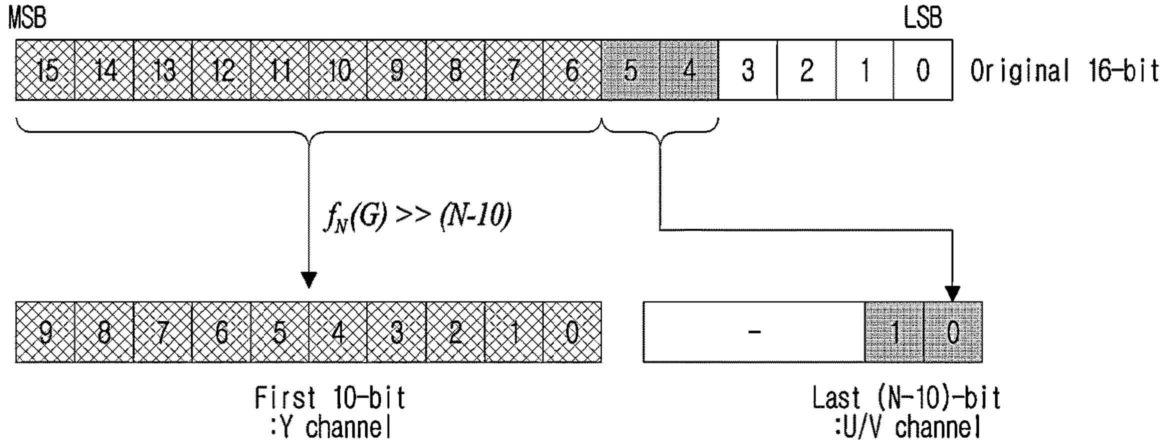
FIG. 14 shows an example in which a 12-bit depth image is encoded/decoded into a 10-bit image.

FIG. 14 shows an example in which a 12-bit depth image is encoded/decoded into a 10-bit image.

After converting a 16-bit original depth image into a 12-bit depth image, a first 10 bits of a 12-bit depth image may be encoded/encoded through a Y channel, and the remaining 2 bits may be encoded/encoded through a chroma channel.

Meanwhile, each pixel of a chroma channel is expressed with 2 bits, so it has a relatively small value. In order to increase the encoding/decoding efficiency of a chroma channel, a value of a chroma channel may be centralized. In other words, a median value of a 10-bit image, i.e., 512 (2^9) may be added to each pixel of a chroma channel.

In a decoder, after decoding a chroma channel, a median value may be subtracted from a decoded pixel value to reconstruct a chroma channel.

Meanwhile, according to a color format, the number of pixels configuring a chroma channel may be less than the number of pixels configuring a luma channel. Accordingly, the concatenation of information on two luma pixels may also be allocated to one chroma pixel. As an example, 4-bit data obtained by concatenating the remaining 2-bit information of a first pixel in a luma channel and the remaining 2-bit information of a second pixel in a luma channel may be allocated to one bit in a chroma channel.

Meanwhile, in order to implement a proposed technology, an image encoding side (i.e., an immersive image processing device in FIG. 1) needs to apply and process a depth information colorization process for a depth atlas image. In addition, an image encoding side needs to encode and signal depth information colorization-related information.

Here, depth information colorization-related information may include at least one of a flag for whether to apply a colorization technique, a bit depth of a depth image generated by performing a low gradational conversion on an original depth image, a bit depth of reference depth information generated by performing a high gradational conversion on a depth image to be encoded, the number of extra bits transmitted through a chroma channel among the depth images converted in a low gradated way, a median value for expressing a negative value in a difference image as a positive value, a scaling parameter for pixel values in a difference image, a method for dividing a depth value into a chroma channel (at least one of an U channel or a V channel) or a relative importance value between a depth image expressed in a luma channel (a Y channel) and a difference image expressed in a chroma channel (at least one of an U channel or a V channel) according to a depth image colorization method.

Here, a relative importance value may be used to determine the importance of a distortion value for a luma channel (a Y channel) and a chroma channel (at least one of an U channel or a V channel) when encoding/decoding colorized depth information. Based on a relative importance value, the compression of colorized depth information in terms of bit rate-distortion may be optimized.

Table 1 shows a syntax structure including information for colorizing depth information.

TABLE 1

| | Descriptor |
|---|---|
| vps_miv_2_extension( ){ | |
| vps_miv_extension( ) | |
| vme_decoder_side_depth_estimation_flag | u(1) |
| vme_patch_margin_enabled_flag | u(1) |
| vme_capture_device_information_present_flag | u(1) |
| if(vme_capture_device_information_present_flag) | |
| capture_device_information( ) | |
| vme_colorized_geometry_enabled_flag | u(1) |
| vme_reserved_zero_8bits | u(8) |
| } | |

In Table 1, a syntax vme_colorized_geometry_enabled_flag represents whether it is allowed to colorize and encode/decode a depth image. When a value of a syntax vme_colorized_geometry_enabled_flag is 1, the colorization-related information of a depth image may exist in a syntax structure.

On the other hand, when a syntax vme_colorized_geometry_enabled_flag is 0, it represents that a depth image is not colorized when a depth image is encoded/decoded. When a value of a syntax vme_colorized_geometry_enabled_flag is 0, the colorization-related information of a depth image does not exist in a syntax structure.

Meanwhile, when a syntax vme_colorized_geometry_enabled_flag does not exist, its value may be inferred as 0.

Table 2 represents the colorization-related information of a depth image included in a syntax structure when the extra bits of a depth image are encoded/decoded through a chroma channel.

TABLE 2

| | Descriptor |
|---|---|
| asps_miv_extension( ){ | |
| asme_ancillary_atlas_flag | |

TABLE 2-continued

| | Descriptor |
|---|---|
| asme_embedded_occupancy_enabled_flag | u(1) |
| if(asme_embedded_occupancy_enabled_flag) | u(1) |
| asme_depth_occ_threshold_flag | u(1) |
| asme_geometry_scale_enabled_flag | |
| if(asme_geometry_scaled_enabled_flag){ | |
| asme_geometry_scale_factor_x_minus1 | u(1) |
| asme_geometry_scale_factor_y_minus1 | u(8) |
| } | |
| ... | |
| asme_max_entity_id | ue(v) |
| asme_inpaint_enabled_flag | u(1) |
| asme_colorized_geometry_enabled_flag | u(1) |
| If(asme_colorized_geometry_enabled_flag) | |
| { | |
| asme_geometry_extended_bit_minus1 | ue(v) |
| } | |
| } | |

In Table 2, a syntax asme_colorized_geometry_enabled_flag represents whether a depth image is colorized. When a value of a syntax asme_colorized_geometry_enabled_flag is 1, it represents that a depth image is colorized. In this case, depth image colorization information may be included in a syntax structure.

On the other hand, when a value of a syntax asme_colorized_geometry_enabled_flag is 0, it represents that a depth image is not colorized. In this case, depth image colorization information may not be included in a syntax structure.

When a syntax asme_colorized_geometry_enabled_flag does not exist, its value may be inferred as 0.

A syntax asme_geometry_extended_bit_minus1 represents a value obtained by subtracting 1 from the number of extra bits transmitted through a chroma channel. As an example, if 10 bits of a 12-bit depth image are encoded/decoded through a luma channel and 2 bits are encoded/decoded through a chroma channel, a value of a syntax asme_geometry_extended_bit_minus1 may be set as 1.

On an image decoding side (i.e., an immersive image synthesis device in FIG. 2), depth information colorization-related information may be used to reconstruct a high-bit (i.e., 12-bit) depth image.

As an example, on an image decoding side, a 10-bit depth image to be encoded may be decoded through a luma channel and a 10-bit difference image may be decoded through a chroma channel. Afterwards, a 10-bit depth image to be encoded and a 10-bit difference image may be combined to reconstruct a 12-bit depth image.

Meanwhile, loss due to image compression may be corrected based on a scaling parameter for pixel values in a depth image. As an example, when an interval of a differential pixel value is 9 due to a scaling parameter, an error value smaller than 5 based on a threshold value of 5 may be reconstructed to its original value.

Alternatively, on an image decoding side, 10-bit information of a 12-bit depth image may be obtained through a luma channel and 2-bit information of a 12-bit depth image may be obtained through a chroma channel. Afterwards, 10-bit information and 2-bit information may be combined to reconstruct a 12-bit depth image.

In the above-described embodiments, a method for colorizing and encoding/decoding depth information was described. However, the above-described embodiments may also be equally applied to a variety of geometric information that was encoded/decoded as a single channel as well as depth information. As an example, embodiments described in the present disclosure may also be used to encode/decode disparity or phase information.

In other words, in the above-described embodiments, substituting a depth image with a disparity image or a phase image is also referred to as being included in the technical idea of the present disclosure.

A name of syntax elements introduced in the above-described embodiments is just temporarily given to describe embodiments according to the present disclosure. Syntax elements may be named differently from what was proposed in the present disclosure.

A component described in illustrative embodiments of the present disclosure may be implemented by a hardware element. For example, the hardware element may include at least one of a digital signal processor (DSP), a processor, a controller, an application-specific integrated circuit (ASIC), a programmable logic element such as a FPGA, a GPU, other electronic device, or a combination thereof. At least some of functions or processes described in illustrative embodiments of the present disclosure may be implemented by a software and a software may be recorded in a recording medium. A component, a function and a process described in illustrative embodiments may be implemented by a combination of a hardware and a software.

A method according to an embodiment of the present disclosure may be implemented by a program which may be performed by a computer and the computer program may be recorded in a variety of recording media such as a magnetic Storage medium, an optical readout medium, a digital storage medium, etc.

A variety of technologies described in the present disclosure may be implemented by a digital electronic circuit, a computer hardware, a firmware, a software or a combination thereof. The technologies may be implemented by a computer program product, i.e., a computer program tangibly implemented on an information medium or a computer program processed by a computer program (e.g., a machine readable storage device (e.g.: a computer readable medium) or a data processing device) or a data processing device or implemented by a signal propagated to operate a data processing device (e.g., a programmable processor, a computer or a plurality of computers).

Computer program(s) may be written in any form of a programming language including a compiled language or an interpreted language and may be distributed in any form including a stand-alone program or module, a component, a subroutine, or other unit suitable for use in a computing environment. A computer program may be performed by one computer or a plurality of computers which are spread in one site or multiple sites and are interconnected by a communication network.

An example of a processor suitable for executing a computer program includes a general-purpose and special-purpose microprocessor and one or more processors of a digital computer. Generally, a processor receives an instruction and data in a read-only memory or a random access memory or both of them. A component of a computer may include at least one processor for executing an instruction and at least one memory device for storing an instruction and data. In addition, a computer may include one or more mass storage devices for storing data, e.g., a magnetic disk, a magnet-optical disk or an optical disk, or may be connected to the mass storage device to receive and/or transmit data. An example of an information medium suitable for implementing a computer program instruction and data includes a semiconductor memory device (e.g., a magnetic medium such as a hard disk, a floppy disk and a magnetic tape), an optical medium such as a compact disk read-only memory (CD-ROM), a digital video disk (DVD), etc., a magnet-optical medium such as a floptical disk, and a ROM (Read Only Memory), a RAM (Random Access Memory), a flash memory, an EPROM (Erasable Programmable ROM), an EEPROM (Electrically Erasable Programmable ROM) and other known computer readable medium. A processor and a memory may be complemented or integrated by a special-purpose logic circuit.

A processor may execute an operating system (OS) and one or more software applications executed in an OS. A processor device may also respond to software execution to access, store, manipulate, process and generate data. For simplicity, a processor device is described in the singular, but those skilled in the art may understand that a processor device may include a plurality of processing elements and/or various types of processing elements. For example, a processor device may include a plurality of processors or a processor and a controller. In addition, it may configure a different processing structure like parallel processors. In addition, a computer readable medium means all media which may be accessed by a computer and may include both a computer storage medium and a transmission medium.

The present disclosure includes detailed description of various detailed implementation examples, but it should be understood that those details do not limit a scope of claims or an invention proposed in the present disclosure and they describe features of a specific illustrative embodiment.

Features which are individually described in illustrative embodiments of the present disclosure may be implemented by a single illustrative embodiment. Conversely, a variety of features described regarding a single illustrative embodiment in the present disclosure may be implemented by a combination or a proper sub-combination of a plurality of illustrative embodiments. Further, in the present disclosure, the features may be operated by a specific combination and may be described as the combination is initially claimed, but in some cases, one or more features may be excluded from a claimed combination or a claimed combination may be changed in a form of a sub-combination or a modified sub-combination.

Likewise, although an operation is described in specific order in a drawing, it should not be understood that it is necessary to execute operations in specific turn or order or it is necessary to perform all operations in order to achieve a desired result. In a specific case, multitasking and parallel processing may be useful. In addition, it should not be understood that a variety of device components should be separated in illustrative embodiments of all embodiments and the above-described program component and device may be packaged into a single software product or multiple software products.

Illustrative embodiments disclosed herein are just illustrative and do not limit a scope of the present disclosure. Those skilled in the art may recognize that illustrative embodiments may be variously modified without departing from a claim and a spirit and a scope of its equivalent.

Accordingly, the present disclosure includes all other replacements, modifications and changes belonging to the following claim.

The invention claimed is:

1. A method of encoding an image, the method comprising:

converting a depth map of a first bit depth to a color image of a second bit depth, the color image comprising a luma channel and one or more chroma channels; and encoding the color image of the second bit depth, wherein the second bit depth is smaller than the first bit depth, wherein upper bits of depth values in the depth map are encoded using luma samples in the color image, wherein remaining bits of the depth values are encoded using chroma samples in the color image, and wherein information indicating a number of the remaining bits encoded using the chroma samples is encoded into a bitstream.

2. The method of claim 1, wherein a value of a chroma sample is derived by adding a median value to a value represented by the remaining bits of a depth value.

3. The method of claim 2, wherein the median value corresponds to a middle value of a range representable by the second bit depth.

4. The method of claim 1, wherein remaining bits of depth values represented by luma samples corresponding to even rows or even columns are included in chroma samples of a first chroma channel, and wherein remaining bits of depth values represented by luma samples corresponding to odd rows or odd columns are included in chroma samples of a second chroma channel.

5. The method of claim 1, wherein a flag indicating whether a depth map is colorized or not is encoded into the bitstream.

6. A method of decoding an image, the method comprising:

decoding a color image of a first bit depth, the color image comprising a luma channel and one or more chroma channels; and reconstructing depth values of a second bit depth from the decoded color image, wherein the first bit depth is smaller than the second bit depth, wherein upper bits of the depth values are reconstructed from luma samples in the decoded color image, wherein remaining bits of the depth values are reconstructed by chroma samples in the decoded color image, and wherein information indicating a number of the remaining bits reconstructed from the chroma samples is decoded from a bitstream.

7. The method of claim 6, wherein, a value represented by remaining bits of a depth value is derived by subtracting a median value from a value of a chroma sample.

8. The method of claim 7, wherein the median value corresponds to a middle value of a range representable by the second bit depth.

9. The method of claim 6, wherein remaining bits of depth values represented by luma samples corresponding to even rows or even columns are reconstructed from chroma samples of a first chroma channel, and wherein remaining bits of depth values represented by luma samples corresponding to odd rows or odd columns are reconstructed from chroma samples of a second chroma channel.

10. The method of claim 9, wherein a flag indicating whether the depth values are encoded using colorization is decoded from the bitstream.

11. A non-transitory computer readable recording medium storing instructions that, when executed by a processor, causes the processor to:

convert a depth map of a first bit depth to a color image of a second bit depth, the color image comprising a luma channel and one or more chroma channels; and encode the color image of the second bit depth, wherein the second bit depth is smaller than the first bit depth, wherein upper bits of depth values in the depth map are encoded using luma samples in the color image, wherein remaining bits of the depth values are encoded using chroma samples in the color image, and wherein information indicating a number of the remaining bits encoded using the chroma samples is encoded into a bitstream.

* * * * *